(12) United States Patent
Sjøgren et al.

(10) Patent No.: US 7,251,641 B2
(45) Date of Patent: Jul. 31, 2007

(54) ADJUSTABLE DATABASE RUNTIME KERNEL

(75) Inventors: Bjørn-Harald Sjøgren, Ski (NO); Jan-Thore Bjørnemyr, Hamar (NO)

(73) Assignee: IT Liberator AS, Oslo (NO)

( * ) Notice: Subject to any disclaimer, the term of this patent is extended or adjusted under 35 U.S.C. 154(b) by 315 days.

(21) Appl. No.: 10/209,917

(22) Filed: Aug. 2, 2002

(65) Prior Publication Data
US 2003/0140028 A1    Jul. 24, 2003

Related U.S. Application Data

(60) Provisional application No. 60/309,163, filed on Aug. 2, 2001.

(30) Foreign Application Priority Data
Aug. 1, 2001    (NO) ................................. 2001 3784

(51) Int. Cl.
G06F 17/30    (2006.01)
G06F 17/00    (2006.01)
(52) U.S. Cl. ............................ 707/1; 707/100; 707/103
(58) Field of Classification Search ................ 707/100, 707/1, 103
See application file for complete search history.

(56) References Cited

U.S. PATENT DOCUMENTS

| | | | |
|---|---|---|---|
| 5,819,090 A | | 10/1998 | Wolf et al. |
| 5,835,910 A | | 11/1998 | Kavanagh et al. |
| 5,842,196 A | * | 11/1998 | Agarwal et al. ............... 707/2 |
| 5,995,969 A | * | 11/1999 | Lee et al. ................... 707/100 |
| 6,029,160 A | * | 2/2000 | Cabrera et al. ................ 707/1 |
| 6,266,666 B1 | | 7/2001 | Ireland et al. |
| 6,366,917 B1 | * | 4/2002 | St. John Herbert, III ... 707/100 |
| 6,378,126 B2 | * | 4/2002 | Tang ........................... 717/143 |
| 6,606,626 B1 | * | 8/2003 | Ponnekanti ..................... 707/8 |
| 2002/0023261 A1 | * | 2/2002 | Goodwin et al. ............ 717/146 |
| 2002/0035559 A1 | * | 3/2002 | Crowe et al. ................... 707/2 |
| 2004/0205690 A1 | * | 10/2004 | Pieper ........................ 717/100 |
| 2004/0220972 A1 | * | 11/2004 | Bhattacharjee et al. ..... 707/200 |

FOREIGN PATENT DOCUMENTS

| | | |
|---|---|---|
| GB | 2 243 005 A | 10/1991 |
| WO | WO 99/54833 A2 | 10/1999 |
| WO | WO 00/52571 A1 | 9/2000 |

* cited by examiner

Primary Examiner—Don Wong
Assistant Examiner—Thanh-Ha Dang
(74) Attorney, Agent, or Firm—Birch, Stewart, Kolasch & Birch, LLP

(57) ABSTRACT

The present invention relates generally to a computer system for providing access to a database upon a request from an application computer program 250. The computer system includes a data model 260 represented in a data dictionary 230, an application program interface, a data storage 220, and a database kernel 210, 215 providing access from the application program interface to the data storage 220. The database kernel 210, 215 comprises a runtime module 210 for providing access from the application program interface to the database kernel and a storage engine module 215 for providing access from the runtime module 210 to the data storage 220. The runtime module 210 is dynamically changeable, dependent on the data model 260 represented in the data dictionary 230, while the storage engine module 215 is invariable and independent of the data model. An automatic code generator 240 is arranged to generate an executable program code for the runtime module 210, based upon the data model 260 represented in the data dictionary 230.

27 Claims, 8 Drawing Sheets

BASE Structure — 310
INDEX Structure — 320
PROJECTION Structure — 330

ADJUSTABLE DATABASE RUNTIME KERNEL

RELATED APPLICATION DATA

This application is related to and claims priority to U.S. Provisional Application No. 60/309,163, filed Aug. 2, 2001, entitled "Adjustable Database Runtime Kernel", which is expressly incorporated herein by reference in its entirety.

DESCRIPTION OF THE BACKGROUND OF THE INVENTION

I. Field of the Invention

This invention relates generally to database technology, and more specifically, to a computer system for providing access to a database upon a request from an application computer program.

II. Background of the Invention

Conventional database systems typically process two types of information, i.e., the actual data and the information describing the data (the meta-data). The meta-data is typically referred to as the data model and may be viewed as structural information, i.e., a description of how the actual data is to be structured.

FIG. 1 depicts a conventional database system. The database as shown in FIG. 1 includes interpreting database runtime module and storage engine 110, data storage 120, online data dictionary 130, schema compiler 140, application program 150, and schema/data model 160. Interpreting database runtime module and storage engine 110 (or database kernel 110) serves as a database runtime storage engine, which functions as the actual data interpreter. Data storage 120 physically stores the data, i.e., data files. Usually, data storage 120 uses the operating system's standard file system, but may have special file access in order to speed up data transfer to and from a disk. Usually, the data storage is platform dependent, where data stored on one platform cannot be transferred to another platform without data conversion.

Online dictionary 130 stores the meta-data. Meta-data may include information describing tables, columns, fields, data types for columns, and domain restrictions for these columns. For example, online dictionary 130 may include information such as: NAME is a character string consisting of characters 'a'-'z', 'A'-'Z', and '.', ' ', '_'; INCOME is a positive integer; CURRENCY is one of 'USD', 'NOK', 'EUR', 'JPY', 'SEK', 'DKK', etc. Online dictionary 130 also stores information about the different constraint types as primary keys, foreign keys, subset constraints, exclude constraints, etc. However, conventional database systems only handle primary keys, unique keys, foreign keys, and mandatory columns. Additionally, information about external views are stored, i.e., how the information is to be presented in a specific application. For example, in one application only the "Name" and "Address" columns of the table "Person" may be viewed, while in another application, "Project", "Assignment" and "Person" tables may be viewed in a compound table "Project-Assignment". Additionally, many data dictionaries also contain user definitions and user authorization information.

Interpreting database runtime module and storage engine 110 is the heart of the database system and handles data retrieval and update requests. In order to fulfill a request, the interpreting database runtime module and storage engine 110 must consult with online data dictionary 130 in order to validate the application's request. The interpreting database runtime module and storage engine 110 checks if the requested data is known, or should be know, by application program 150, and performs a mapping to the underlying data model. The online data dictionary is then consulted in order to determine how the actual request to the storage engine should be expressed. When the result from the storage engine is returned, the interpreting database runtime module and storage engine 110 has to again consult the online data dictionary 130 in order to perform a transformation of the retrieved data to fit the applications expectations with respect to naming and structure.

If the application program 150 wants to update the database by either inserting new data or deleting or updating existing data, the interpreting database runtime module and storage engine 110 performs a consistency check of the database based on the rules stored in the online data dictionary 130. For each rule in the online data dictionary 130, the interpreting database runtime module and storage engine 110 has to analyze the rule and perform a consistency check. This is very complicated and time consuming. Conventional database systems perform this type of consistency control after every update to prevent a large backlog of consistency controls needing to be performed. If the controls were carried out immediately, the functionality required to perform the control after the entire transaction has been carried out would be very complex. As a result, conventional the interpreting database runtime module and storage engines 110 are oversized which creates inefficiency.

The schema compiler 140 checks the data model for consistency. If the data model is consistent it stores the data model information in the data dictionary. If a customer has only has a runtime version of the database system, the schema compiler 140 is left out. The ability to make changes to the data model is then efficiently removed (Create Table, Alter Table and Drop Table will not work). Additionally, in current SQL databases, the schema compiler is accessible from most applications (including user-developed applications).

Further, in conventional database systems, when an application issues an update or retrieval request to the database system, the interpreting database runtime module and storage engine 110 has to dynamically validate the request and dynamically create an execution plan. In performing these tasks, the system has to send many inquiries to the data dictionary 130 and interpret the results. This has to be done for every single request. Any inquiry to the data dictionary 130 decreases performance significantly. It also requires the interpreting database runtime module and storage engine 110 to be constructed such that all types of data models can be handled. As a result, there is a lot more program code than necessary for most data models. Further, the interpreting database runtime module and storage engine 110 is oversized for most applications.

Thus, in order to handle all types of data models, including a complete set of integrity enforcement rules and proper transaction handling in conjunction with the constraints, the complexity of such an interpreting database runtime module and storage engine 110 will increase tremendously and the performance will drop catastrophically. Therefore, current interpreting database runtime module and storage engine 110 only handle a small portion of possible data models, they only offer a limited set of constraint mechanisms, they offer a limited transaction model and finally they suffer from poor performance and oversized executables.

As such, there is a need for a database system that reduces computing power requirements and for facilitating database and application programming to ease constraint handling and thereby reduce application complexity.

SUMMARY OF THE INVENTION

In accordance with principles of the present invention, as embodied and broadly described herein, methods and systems consistent with the principles of the present invention provide for providing access to a database upon a request from an application computer program. The system includes a data model represented in a data dictionary; an application program interface; data storage; a database kernel, providing access from the application program interface to the data storage; wherein the database kernel includes a database runtime module for providing access from the application program interface to the database kernel, the runtime module being dynamically changeable, dependent on the data model represented in the data dictionary, and a storage engine module for providing access from the runtime module to the data storage, the storage engine module being invariable and independent of the data model.

Alternatively, systems and methods may provide for improving a database system for providing access to a database upon a request from an application computer program. The system may include a data model represented in a data dictionary; an application program interface; data storage; a database kernel providing access from the application program interface to the data storage. The method may include providing in the database kernel a database runtime module for providing access from the application program interface to the database kernel, the runtime module being dynamically changeable, dependent on the data model represented in the data dictionary; and providing in the database kernel a storage engine module for providing access from the runtime module to the data storage, the storage engine module being invariable, independent of the data model.

Alternatively, systems and methods may provide access to a database upon a request from an application computer program. The system may include a data model represented in a data dictionary; an application program interface; data storage; and a database kernel, providing access from the application program interface to the data storage. The database kernel may include a database runtime module for providing access from the application program interface to the database kernel, the runtime module being dynamically changeable, dependent on the data model represented in the data dictionary; and a storage engine module for providing access front the runtime module to the data storage, the storage engine module being invariable and independent of the data model.

Alternatively, systems and methods may provide access to a database upon a request from an application computer program. The system may include a data model represented in a data dictionary; an application program interface; data storage; and a database kernel, providing access from the application program interface to the data storage. The database kernel may include a database runtime module for providing access from the application program interface to the database kernel, the runtime module being dynamically changeable, dependent on the data model represented in the data dictionary; and a storage engine module for providing access from the runtime module to the data storage, the storage engine module being invariable, independent of the data model, an automatic code generator, the code generator being adapted to generate an executable program code for the runtime module based upon the data model.

Additional features and principles of the present invention will be set forth in part in the description which follows, and in part will be obvious from the description, or may be learned by practice of the invention. The features and principles of the present invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention, and, together with the description, explain the features and aspects of the invention. In the drawings.

DESCRIPTION OF THE EMBODIMENTS

Figure 1:
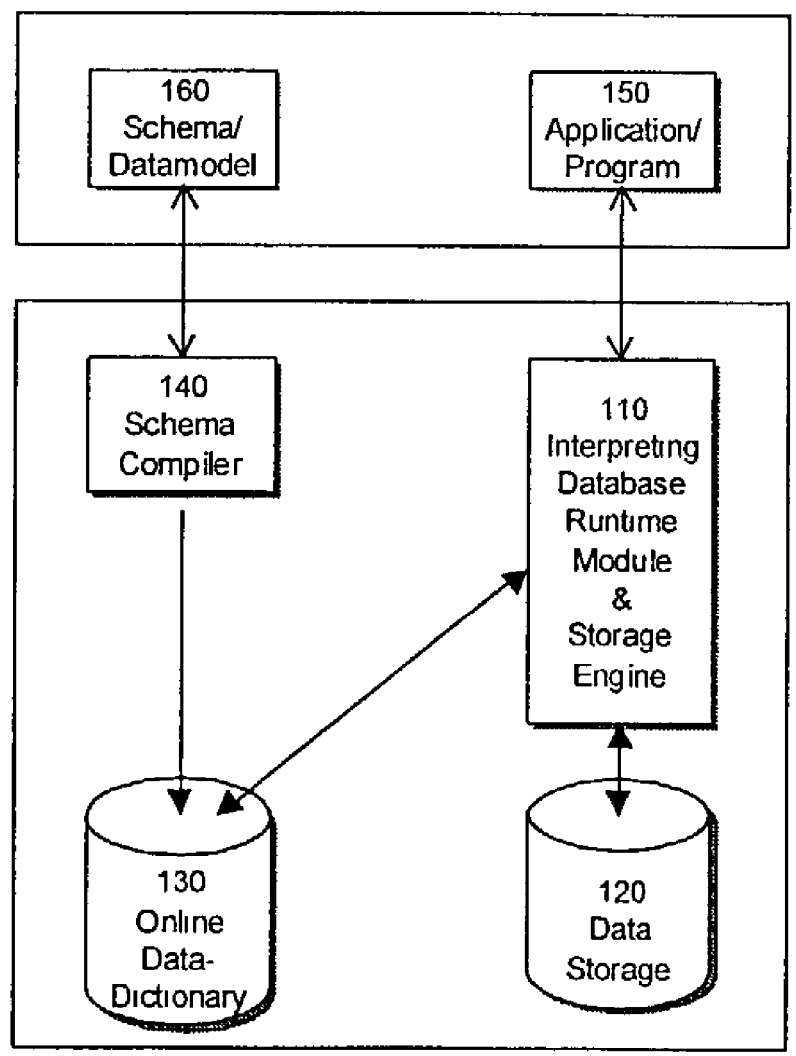
FIG. 1 is an exemplary diagram of a conventional system environment.

Reference will now be made in detail to the present invention, examples of which are illustrated in the accompanying drawings. Wherever possible, the same reference numbers will be used throughout the drawings to refer to the same or like parts.

The present invention relates generally to a computer system for providing access to a database upon a request from an application computer program 250. The computer system includes a data model 260 represented in a data dictionary 230, an application program interface, a data storage 220, and a database kernel 210, 215 providing access from the application program interface to the data storage 220. The database kernel 210, 215 comprises a runtime module 210 for providing access from the application program interface to the database kernel and a storage engine module 215 for providing access from the runtime module 210 to the data storage 220. The runtime module 210 is dynamically changeable, dependent on the data model 260 represented in the data dictionary 230, while the storage engine module 215 is invariable and independent of the data model. An automatic code generator 240 is arranged to generate an executable program code for the runtime module 210, based upon the data model 260 represented in the data dictionary 230.

Figure 2:
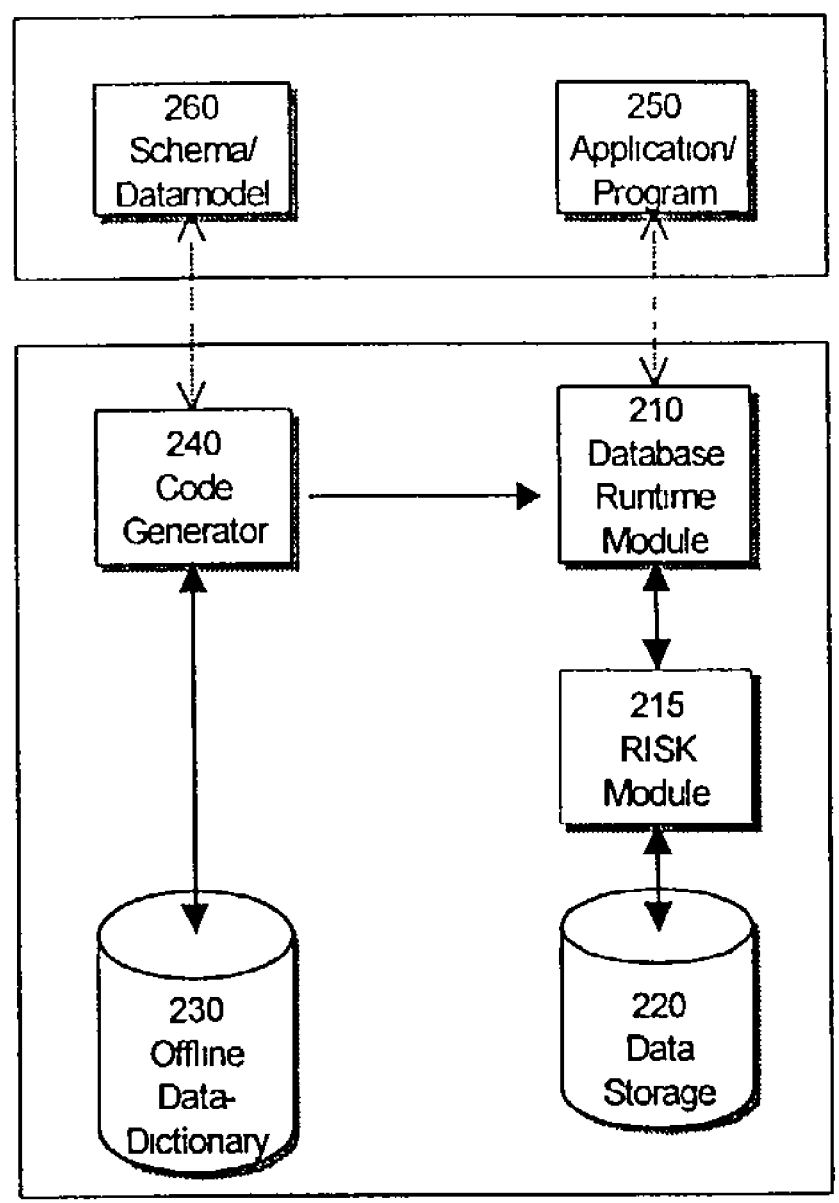
FIG. 2 is an exemplary block diagram illustrating a database system consistent with the principles of the present invention.

FIG. 2 is a schematic block diagram illustrating a database system according to the invention. The system includes a database runtime module 210, a storage engine denoted a RISK module (Reduced Instruction Set Kernel) 215, a data storage 220, an offline data dictionary 230, and a code generator 240, which also has the capability to act as a schema compiler as indicated by 140 in FIG. 1. Application program 250 and schema/data model 260 may be external elements, which do not form part of the system.

When a new data model is introduced, the code generator first compiles the schema similar to the prior art schema compiler 140 and stores the structural information in the offline data dictionary 230. Then, based on the stored information in the offline data dictionary, a new database runtime module 210 is generated. The newly created source code may then be compiled. Upon successful compilation a new database runtime module is created. Although the database runtime module 210 is generated and unique for each data model, the application programming interface (the part of database runtime module 210 seen by the application) is unchanged.

The arrow between the code generator 240 and database runtime module 210 is a one way arrow indicting that it is not possible for the database runtime module 210 to access the data dictionary 230.

Consistent with the principles of the present invention, and in contrast to the use of a database system with online data dictionary, the database kernel, which includes the database runtime module 210 and the storage engine/RISK module 215, is based on the data model. More specifically, the database runtime module part 210 of the kernel is based on the data model, whereas the storage engine 215 is not. As an application 250 wants to carry out a database operation, it will send the query to the database runtime module 210 that immediately may pass the right query to a storage engine 215 denoted a RISK module. The information returned to the runtime module 210 by the RISK module 215 may be immediately understood by the runtime module 210 and transferred back to the application 250.

The code generator 240

The code generator 240 automatically creates the best possible runtime environment for a given data model (the data model stored in the data dictionary 230). The use of a code generator in this setting tailors the database kernel to suit a specific need at the same time maximum flexibility is ensured due to the data dictionary 230. In principle, almost all code generators may be used as the code generator 240, if the supporting data dictionary 230 has sufficient structures to express a general data model structure and all types of constraints. The code generator 240 should be neutral to which format or language the code is produced.

The code generator 240 may have integrated template(s) and/or dictionaries, or alternatively separate template(s) and/or dictionary. The code generator 240 may be perfectly capable to generate C, C++, Pascal, Java, as well as SQL schemas, OQL schemas, and Word documents, provided templates are developed. The neutrality has significantly eased the process to tailor the template that is the basis for the code produced. The neutrality is not imperative, but a non-template-based generator will certainly create a more complicated development process.

Figure 7:
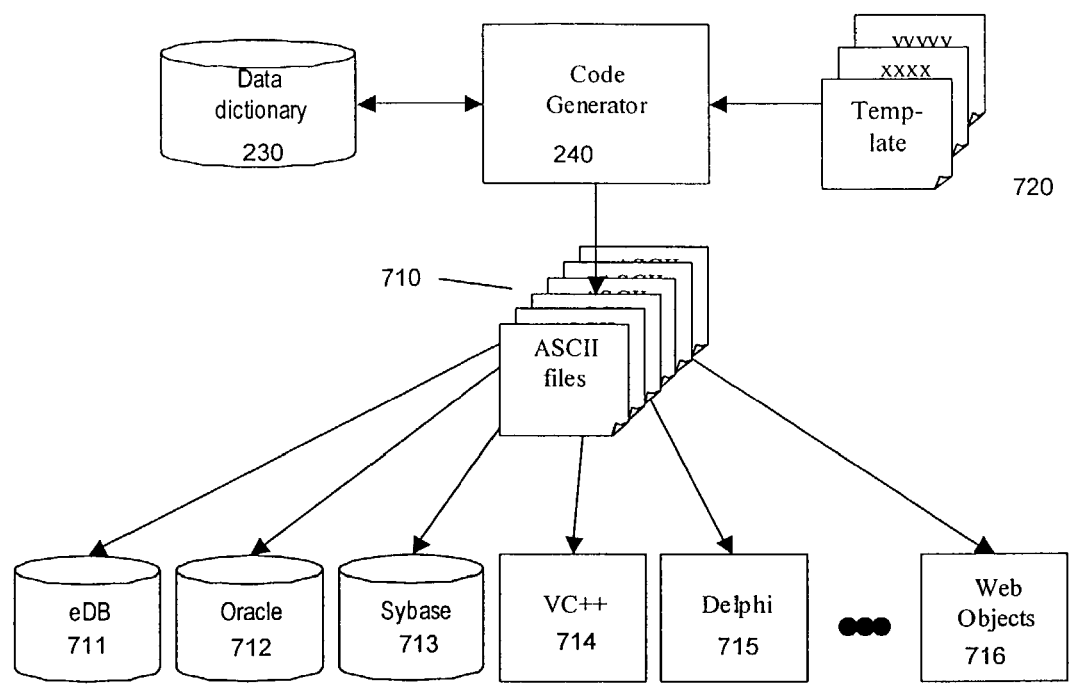
FIG. 7 depicts an exemplary block diagram illustrating the principles of a code generator consistent with the principles of the present invention.

FIG. 7 is a block diagram further illustrating the principles of a code generator, consistent with the principles of the present invention. As shown in FIG. 7, code generator 240 cooperates with offline data dictionary 230 and the templates 720. The code generator 240 produces documents 710 based on the offline data dictionary 230, which describes the data model and the expected output. The templates 720 describe the syntactical rules and constructions that the code must conform to. The code produced by the code generator 240 may both be descriptive and procedural. As shown in FIG. 7, the produced documents 710 may be of different types, such as eDB 711, Oracle 712, Sybase 713, VC++ 714, Delphi 715, Web objects 716, etc.

Both, these code examples may be produced:

Select Name, Address, Income, Department from Employee;

```
SetRecordType(Employee)
GetFirstRecord(WA)
While (!LastRecord(WA)) {
  GetNextRecord(WA);
  Printf("Name = °/8s, Address = %Ins, Income = %s, Department = %s/n, WA.Name, WA.Address, WA.Income, WA.Department);
}
```

Templates 720

The templates 720 describe the code production process. A template can be regarded as a Microsoft Word Template, but in addition it has to have control flow mechanisms that manage the actual production process. An example of a template is:

```
// This part of the code produces struct definitions for each table found in the data dictionary:
    typedef struct {
    char Name [32+1]
    int Type:
    int Length;
    int Fraction;
    int Nullable:
    } ColumnType;
    char * currentTable;
    ColumnType * currentColumn;
    CurrentTable = GetFirstTableNamefromDictionary( )
    while (currentTable) (
        printf(<</* For %s data definition */\ntypedef struct
            (\n>>, currentTable),
        currentColumn - GetFirstColumn(currentTable);
        while (currentColumn) [
            printf(Boolean NU__%s;\n>>, currentColumn->Name);
            switch (currentcolumn->Type) (
            TEXT:
                printf(<<char    %s [%d];\n>>,
                    currentColumn->Name,
currentColumn-
    >Length) ;
                    break;
            INTEGER:
                printf(<<char    %s [%d];\n>>,
                    currentColumn->Name,
currentColumn-
    >Length);
                    break;
            <Part removed to improve readability>
            )
            currentColumn = GetNextColumn(currentTable);
        printf(<<) s__%s;\n\n>>, currentTable);
        currentTable - GetNextTableNamefromDictionary( )
    );
// This part of the template produces obtain function that recognizes the different tables:
printf(<<short eDB__OBT(String3l RecordTypeName, string3l IndexName) {\n\n>>);
printi(<<short         Btreet;\n>>);
printf(<<short         Itree;\n>>);
printf(<<short         Error      = RuntimeError;\n>>);
printf(<<long          Rownum;\n>>);
printf(<<short         WA__Length;\n>>);
printf(<<short         *CuUnptr;\n>>);
printf(<<short         *CuPrTyPtr;\n>>);
printf(<<Boolean       *CuViPtr;\n>>);
printf(<<Boolean       *CuExPtr;\n>>):
printf(<<QueryType     Keytype    = ExactIndex;\n*);
printf(<<Boolean MainEstablished       - false;\nn);
```

-continued

```
printf(<<Btrae = TreeNumberOf(RecordTypeName);\n>>);
printf(<<if (Btree == NoTree)\n>>);
printf(<<     return UnknownRecordtype;\n>>):
(part removed to improve readability>
CurrentTable = GettirstTableNamefromDictionary( );
while (currentTable) [
    printf(<<   switch(Btree) (<<);
    printf(<<   case TR_%s:\n>>, currentTable);
        printf("StDB_%s.Rownum = Rownum\n>>, currentTable);
        printf("      eDb_%s.Rownum - Rownum;\n>>
        printf("      Itree     - TreeNumberOf(\"Io1_%s\");\n>>, currentTable);
        printf("      Error     = CopyoldRAtoOldIA(Btree, Itree) \ n>>);
        printf("      if (Error != Noerr)\n>>);
        printf("          (CopyOldRAToCurrentRA(Btree); return Error;) \n>>);
    (Part removed to improve readability>
    currentTable = GetNextTableNamefromDictionary( );
);
```

As one can see this may be a program that produces a certain code in a certain language. In this example the template is actually an integrated part of the code generator, but it may be viewed as a separate part that is input to or included in the code generator depending on what kind of code the generator is configured to produce.

The Code Produced

For each table, for each column and foreign key construction referred in the dictionary, the code generator will produce a set of instructions, as indicated in the previous section. Basically a c-struct is produced for each table and a set of functions operate on these structures. Finally, it uses RISK functions to store the data and to retrieve already stored data.

The code produced looks similar to this. The following is an example of actual output but has been reduced slightly to improve readability:

```
$MicroExportHeader$example\eDBStat.h
/* For Department data definition       */
typedef struct (
    Boolean     NU_Budget_for;
    char        Budget_for[13];
    Boolean     NU_DeptName_for;
    char        DeptName_for[31];
    long        BC_Logstatus;
) S_Department;
/* For Employee data definition        *!
typedef struct(
    Boolean     NU_MobilePhone_for;
    char        MobilePhone_for[16];
    Boolean     ND_EmpName_for;
    char        EmpName_for[21];
    Boolean     NU_Budget_has;
    char        Budget_has[13];
    long        BC_Logstatus;
) S_Employee
<Code removed>
short eDB-OBT(String31 RecordTypeName, String31 IndexName) (
    short       Btree;
    short       Itree;
    short       Error       = RuntimeError;
    long        Rownum;
    short       WA_Length;
    short       *CuUnPtr;
    short       *CuPrTyPtr;
    Boolean     *CuViPtr;
    Boolean     *CuExPtr;
    QueryType Keytype   - Exact Index;
    Boolean   MainEstablished - false;
    Btree - TreeNumberOf(RecordTypeName);
    if (Btree == NoTree)
        return UnknownRecordType;
    Itree = IndexNumberOf(RecordTypeName, IndexName);
    if (Itree == NoTree)
        return UnknownIndexType;
    if (Itree == UniversalIndex)
        return IllegalIndex;
    //Call Before
    ConstraintViolation.DiagNo = 0;
    stropy((char*) ConstraintViolation.Message,"           ");
    CopyCurrentRAToOldRA(Btree);
    if (Itree == QueryIndex) (
        EstablishCurrentPtrs(Btree, &CuUnPtr, &CuPrTyPtr, &CuViPtr, &CuExPtr);
        if (*CuUnPtr == 0) (
            Itree = BestUbdex(Btree, &Keytype);
            if (Keytype == NoQuery)
                return EmptyKey;
        EstablishCurrentPtrs(Btree, &CuUnPtr, &CuPrTyPtr, &CuViPtr, &CuE
```

-continued

```
xPtr);
            }
            Error        = MoveQueryToIA(Btree, *CuUnPtr);
            WA_Length    = CompressIndInWA(*CuUnPtr);
            Itree        = *CuUnPtr;
            *CuExptr - false;
            switch (*CuPrTyPtr) (
1~              case ExactIndex:
                case MajorIndex:
                    Error = KernelObtainDirect(Itree, First, WA, 0, WA_Length
- 4);
                    break;
                case ExactAndNo:
                case MajorAndNo:
                    Error = KernelObtainDirect(Itree, First, WA, 0, WA_Length
- 4);
                    MainEstablished = true;
                    while ((Error == NoErr)) (
                        Error    = ExpandIndFromWA(Itree);
                        if (!MatchIndex(Itree))
                            (Error = NotFound; goto Exit;)
                        Rownum   = FetchRecordID(Itree);
                        memset(WA, 0, WASize);
                        storeLongInBytes(WA, 0, Rownum);
                        Error    = KernelObtainDirect(Btree, First, WA, 0, 4);
                        if (Error !- NoErr)
                            (Error = RuntimeError; goto Exit;)
                        ExpandFromWA(Btree):
                        if (MatchQuery(Btree))
                            goto FetchMain;
                        WA_Length = CompressIndInWA(Itree);
                        Error = KernelObtainRelative(Itree, Next, WA, 0, WA_Length
                            - 4);
                    )//loop until match;
                    goto Exit;
                case NoIndex:
                case AllScan:
                    memset(WA, 0, WASize);
                    Error = KernelObtainPosition(Btree, First, WA, 0, 4);
                    If (Error !- NoErr)
                        goto Exit;
                    ExpandFromWA(Btree);
                    MainEstablished - true;
                    while (!MatchQuery(Btree))
                        Error = KernelObtainRelative(Btree, Next, WA, 0, 4);
                        if (Error !- NoErr)
                            goto Exit;
                        ExpandFromWA(Btree);
                    )
                    goto FetchMain;
                case IndexScan:
                    Error = KernelObtainPosition(Itree, First, WA, 0, 4);
                    if (Error !- NoErr)
                        goto Exit;
                    ExpandIndFromWA(Itree);
                    while (!MatchIndex(Itree))
                        WA_Length - CompressIndInWA(Itree);
                        Error - KernelObtainRelative(Itree, Next, WA, 0, WA_Length
- 4);
                        if (Error !- NoErr)
                            goto Exit;
                        ExpandIndFromWA(Itree);
                    )
                    goto FetchMain;
                )
            ) else (
                CLEAR_Current_Query(Btree);
                Error = MoveRecordBufferToIA(Btree,Itree);
                if ((Error != NoErr) && (Error != MissingMandatory) &&
(Error != ValueError))
                    goto Exit;
                WA_Length = CompressIndInWA, (Itree);
                if (WA_Length != 0)
                    Error = KernelObtainDirect(Itree, First, WA, 0, WA_Length
    - 4);
                else
                    (Error = EmptyKey; goto Exit;)
            )
            if (Error != NoErr)
```

```
            goto Exit;
    FetchMain:
        if (!MainEstablished) {
            Error       = ExpandIndFromWA(Itree);
            Rownum      = FetchRecordID(Itree);
            memset(WA, 0, WASize);
            StoreLongInBytes(WA, 0, Rownum);
            Error       = KernelObtainDirect(Btree, First, WA, 0, 4);
            if (Error != NoErr)
                goto Exit;
            ExpandFromWA(Btree);
        )
        Error    = MoveRAToRecordBuffer(Btree);
    Exit:
        if (Error != NoErr) {
            CopyOldRAToCurrentRA(Btree);
            return Error;
        )
        return NoErr;
) /*eDB_OBT*/
```

Offline data dictionary 230

Figure 8:
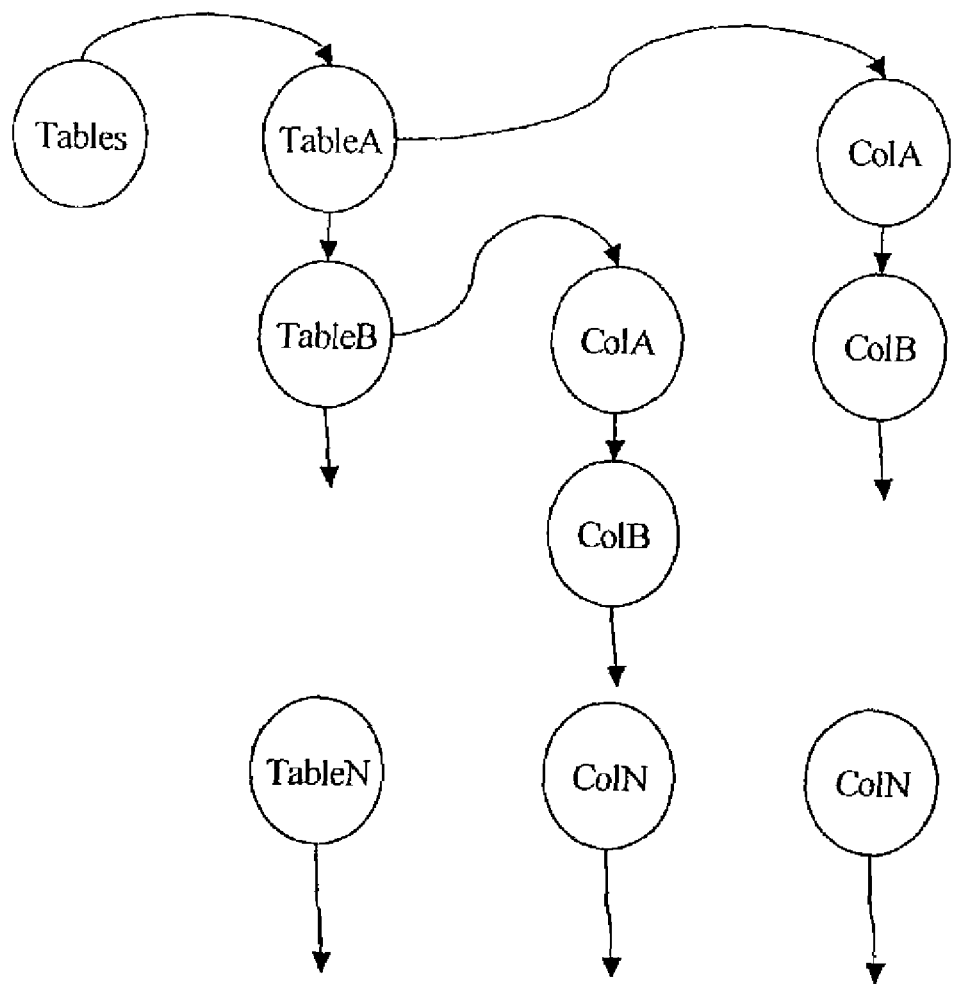
FIG. 8 depicts an exemplary diagram illustrating a data dictionary structure consistent with the principles of the present invention.

Offline data dictionary 230 contains the same kind of information as an online data dictionary in traditional database systems. It may also play the same role as a placeholder for structural information. It includes the basic table or object structure including columns/attributes. It also includes the concept of domains, and a wide variety of integrity rules. The data dictionary is basically a description of the data model. It may have elements, for example, such as Domain (or data types), tables, and columns. Offline data dictionary further includes information regarding constraints as foreign key etc. The data dictionary is structured as a flat ASCII file describing all elements necessary. An example of such a structure, consistent with the principles of the present invention, is schematically illustrated in FIG. 8.

For each table object, TableName is stored as an attribute. For each column object ColumName, Type, Mandatory, etc., are stored as attributes. In addition to the structure illustrated above and with reference to FIG. 8, similar structures for Indexes, PrimaryKeys, ForeignKeys, etc., are implemented in the dictionary. The actual layout of the data dictionary looks like this:

```
WinLAST X9 Semantical 1
MODEL 2001-07-30 15:01:49 2001-07-30 15:02:07    1 x9
    DOMAIN Budget              FIXED       10 2
    DOMAIN DeptName            CHARACTER 30 0
    DOMAIN EmpName             CHARACTER 20 0
    DOMAIN MobilePhone         CHARACTER 15 0
    RECORD Department                 100
    ELEMENT Budget__for               1 NOTNULL
    ELEMENT DeptName__for             2 NOTNULL
    RECORD Employee                   100
    ELEMENT MobilePhone__for          4 NOTNULL
    ELEMENT EmpName__for              3 NOTNULL
    ELEMENT Budget__has               1 NOTNULL
    UNIQUE I01__Department            Department
    ELEMENT Budget__for               1
    UNIQUE I2__Department             Department
    ELEMENT DeptName__for             2
    UNIQUE I01__Employee              Employee
    ELEMENT MobilePhone__for          4
    UNIQUE I2__Employee               Employee
    ELEMENT EmpName__for              3
    SUBSET Department__Employee       Department
    ELEMENT Budget__for               1
    MEMBER Employee
    ELEMENT Budget__has               1
```

```
    RENAME 2001-07-30 15:02:07            1
    EXTERNALS 2001-07-30 15:02:07         1
    HISTORY    1
    END_DICTIONARY
```

Database runtime module 210

Database runtime module 210 includes a set of record definitions and functions tailored to the actual data model as described in the database schema 260 and in the offline data dictionary 230. For each table there is a struct definition (or record definition) and a set of basic operations. These operations include functions for insert, delete, update and retrieve.

EXAMPLE

```
For a table Person there will be a struct definition as
typedef struct Person {
    char name[21];
    char address[31];
    ...
    double income;
and functions:
    eDB_INSERT_Person( );
    eDB_DELETE_Person( );
    eDB_UPDATE_Person( );
    eDB_OBTAIN_Person(AccessPath);
```

All these functions are wrapped in common functions:
eDB_INSERT(<table name>)
eDB_DELETE(<table name>)
eDB_UPDATE(<table name>)
eDB_OBT_<modifier>(<table name>, <AccessPath>)

All of these functions may be applied to the data model. For instance, the insert function knows the format for each attribute, which attributes are mandatory, which integrity rules are involved, etc., and also how the information is formatted and where the information resides in the permanent storage.

The eDB INSERT function

The insert function knows all about involved constraint and integrity rules that apply for the actual object type handled by this function. Thus the insert function does not have to consult any data dictionary in order to figure out which measures that must be taken in order to validate the data.

At pseudo level the code looks like this:

```
eDB_INSERT(table_name) {
    switch(table_name) {
        default:
            do_error;
        case table1:
            // Check format
            check format of column1 of table1; if not ok
            do_error:
            check format of column2 of table1; if not ok do_error;
            check format of columnN of table1; if not ok
            do_error;
            // Check mandatory columns
            check if mandatory_col1 of table 1 is present; if not do_error;
            check if mandatory_col2 of table 1 is present; if not do_error,
            check if mandatory_colK of table 1 is present; if not do_error;
            // Check each individual value
            check value of col1; if not ok do_error;
            check value of col2; if not ok do_error,
            // Check foreign key
            // Check joint total
            // Check other constraints
            CompressData( )
            dbID = KernelStoreRecord( ); If not ok do_error;
            idxVal = CreateIndexValue(Index1);
            KernelStoreIndex(Index1, idxVal, dbID):
            // Check for unique key violations
            idxVal = CreateIndexValue(Index2);
            KernelStoreIndex(Index2, idxVal, dbID);
            // Check for unique key violations
            idxVal = CreateIndexValue(IndexL);
            KernelStoreIndex(IndexL, idxVal, dbID);
            // Check for unique key violations
            //If this point is reached
            return NoError;
        case table2:
    }
}
```

As one of ordinary skill in the art can appreciate, all necessary code to ensure the complete set of controls are present. Because the structural information is already within the code, the code will execute very efficiently.

The delete function

In the exact same manner, as insert function, the delete function knows all about the involved integrity rules, and how to interpret the data.

```
eDB_DELETE(tablename) {
    switch(table name)
        default;
            do error;
        case table1:
            // Check format
            KernelDeleteRecord(RecordType1)
            IdxVal = CreateIndexValue(RecordType 1, Index1 );
            KernelObtain(Index1, idxVal);
            KernelDeleteIndex(Index1, idxVal);
            // Check for foreign key violations
            idxVal = CreateIndexValue(RecordType1, Index2);
            KernelObtain(Index2, idxVal);
            KernelDeleteIndex(Index2, idxVal);
            // Check for foreign key violations
            idxVal = CreateIndexValue(RecordType 1, IndexL);
            KernelObtain(IndexL, idxVal);
```

```
            KernelDeleteIndex(IndexL, IdxVal);
            // Check for unique key violations
            // If this point is reached the update went OK
            return NoError;
        case table2:
    }
}
```

The update function

In the exact same manner as insert function the update function knows all about the involved integrity rules. In fact update combines the insert and delete functionality.

The obtain function

The obtain function comes in a large number of varieties. These varieties falls into three categories: Direct, Relative and Position. As the obtain function knows the data structure this function does not need any dictionary.

Common for all obtain functions is that the result set consists of 0 or 1 records. These functions are thus record oriented and not set oriented.

ObtainDirect enables the application to perform a specified search in the database, which performs a search for a data entry having a special value or values.

EXAMPLE

Person.name='Bill';
eDB_OBT_Direct(Person)

ObtainRelative enables the application to navigate from current item forwards or backwards following an index. The obtain-relative function may either be positional (item next or prior to current), based on different value (next-different or prior-different) or based on same value (next or prior with same value).

EXAMPLE eDB_OBT_Relative(Person, Next)//Returns next person after Bill
eDB_OBT_Relative(Person, NextDifferent)//Returns next person with another name
eDB_OBT_Relative(Person, NextEqual)//Returns next person with same name.
eDB_OBT_Relative(Person, Prior)//Returns next person prior to Bill
eDB_OBT_Relative(Person, PriorDifferent)//Returns prior person with another name
eDB_OBT_Relative(Person, PriorEqual)//Returns prior person with same name.

ObtainPosition enables the application to directly access first or last data item.

EXAMPLE

EDB_OBT_Position(Person, First)//Returns first person, according to an index.
eDB_OBT_Relative(Person, Last)//Returns last person, according to an index.

In addition to the above parameters, an index name can be added to specify which ordering of data to use when navigating in the database.

The RISK Module 215

The RISK module 215 is what generally is recognized as storage engine. The RISK module offers the database runtime module 210 a platform-independent access to the data.

In order to offer the database runtime module 210 a high performance access to the data, the RISK module (storage engine) undertook some dramatic changes. The knowledge about and interpretation of data structures were removed from the storage engine. Basically the storage engine stores unformatted data and retrieves the same data very efficiently. It has been extended with a set of navigational functions to let the runtime module search and retrieve the desired information very quickly. The navigational tool include functions like 'Getfirst', 'GetLast', 'GetGreaterThan', 'GetLessThan', 'Next', 'Prior', 'NextDifferent', 'PriorDifferent'.

In order to be able to retrieve entries using, for instance, 'GetGreaterThan', the RISK module 215 has to have different structures that maintain an ordering of the data. Basically the RISK module offer three types of structures: BASE, INDEX, and PROJECTION. See the data storage section below for a further description of these structures.

Data Storage 220

Figure 3:
FIG. 3 is an exemplary data structure diagram illustrating three types of data structures, consistent with the principles of the present invention.
Figure 3:
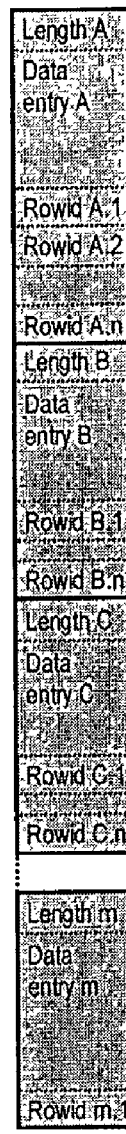
Figure 3:

Data storage 220 provides for the physical storage of data, i.e. data files. FIG. 3 is a data structure diagram illustrating three types of data structures that may be handled by the RISK module 215 and stored in the data storage 220: BASE 310, INDEX 320, and PROJECTION 330.

There are two types of storage structures handled by RISK module. The first is an unordered set of data, which is the BASE structure 310, and the second is the ordered set of data, which is the INDEX structure 320. The PROJECTION structure is just a simplified INDEX structure.

BASE structure 310 is the basic structure that holds the actual information. The information is stored linearly as they are entered into the database. Each data entry may have a variable size (length) and a unique rowid.

INDEX structure 320 is the structure used to index the base structure 310. Note that neither the RISK module nor the data storage itself knows about the logical (and actual) connections between these structures. As for BASE structure 310, data entry is a variable sized data area. For each data entry, the length and a set of rowids where the actual value are referenced. Note that this is a fairly compact way of storing the data while at the same time ensuring a high performance.

PROJECTION structure 330 is a structure to hold information about the BASE (or INDEX) structure. It is a bookkeeping function that counts how many entries of, for instance, the value 'YES' are in a database table. As for the INDEX structure 320, the RISK module or the data storage itself knows about this interconnection. As for INDEX structure the data is a variable sized data entry, but instead of storing each individual rowid, only the number of rowids are stored. The internal structure of data entries of these structures 310, 320, 330 is not known by the RISK module 215. The data entries are seen as complete undividable items. In fact these data entries can have a very complicated structure, but this internal structure is only known by database runtime module 210.

Every BASE structure 310 data entry has an unique identifier named Rowid. The Rowid is created by the RISK module 215. Data entries in the INDEX structure 320 do not have unique Rowids, each data entry has a set of associated Rowids. Data entries in the PROJECTION structure 330 do not have rowids at all, only a number that tells how many associated rowids a corresponding data entry in an index structure 320 would have had.

As the RISK module 215 does not contain any dictionary kind of information it is not capable to maintain any inter-consistency between the different structures. It is the runtime module 210 that maintains the internal consistency between the different structures, as that module is the only module that has knowledge of the data model 260.

Work Flow

Figure 4:
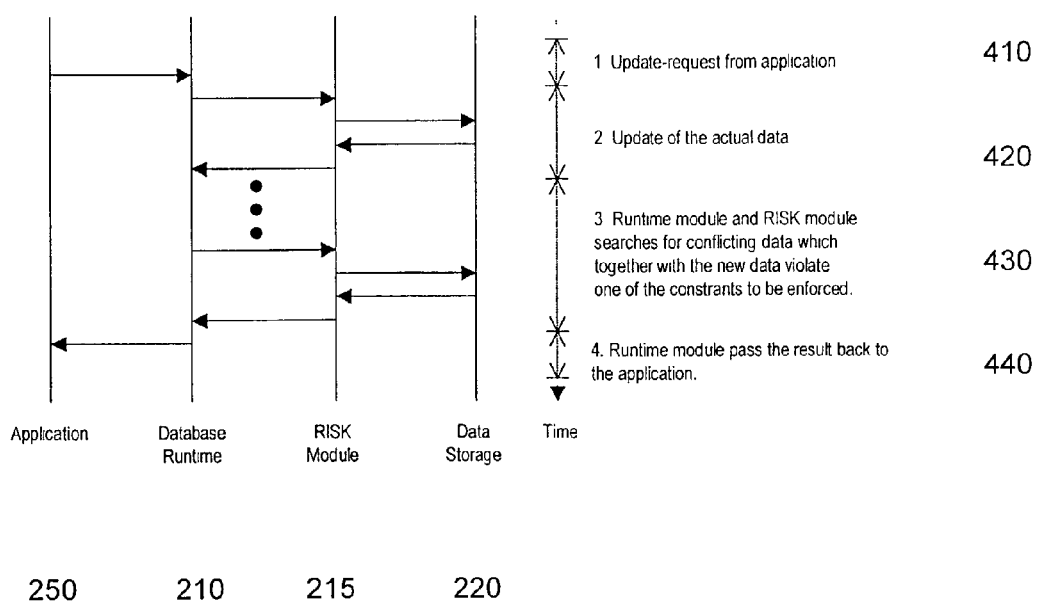
FIG. 4 depicts an sequence diagram illustrating an example of an update sequence consistent with the principles of the present invention.

FIG. 4 is a sequence diagram illustrating an example of an update sequence. The sequence comprises four stages:

1. An update request 410 from the application program 250, via the application program interface, to the database runtime module 210, further to the RISK module 215 and to the data storage 220.

2. An update 420 of the actual data stored in the data storage 420 is performed.

3. An integrity check 430 is performed, wherein the database runtime module 210 and the RISK module 215 searches for conflicts/violations.

4. A return 440 is performed, wherein the runtime module passes the result back to the application program 250.

As can be seen from FIG. 4, there is no data dictionary to be queried. All necessary structural information is present in the generated database runtime module 210.

Advantages

Figure 5:
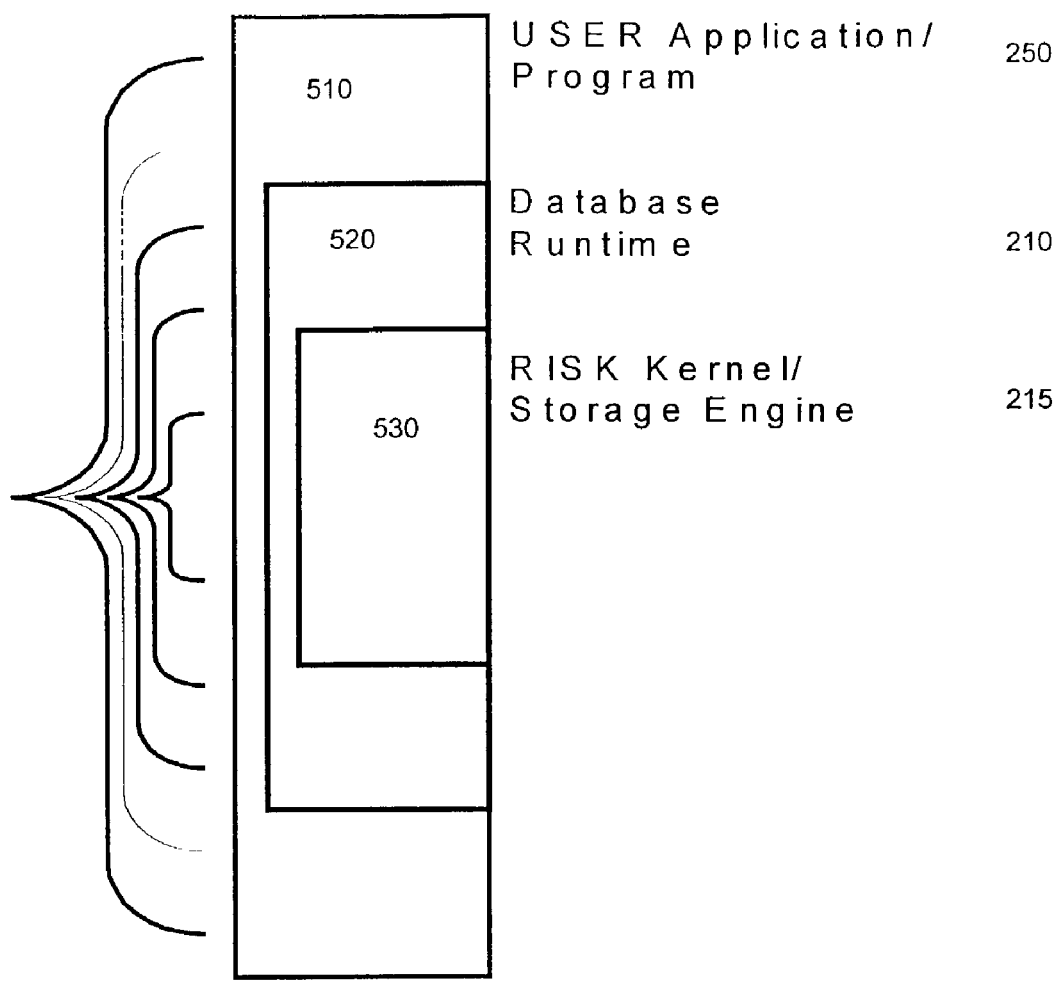
FIG. 5 depicts an diagram illustrating an exemplary data processing hierarchy consistent with the principles of the present invention.

Basically every computer program is a set of loops that repeats a set of tasks a number of times. These loops lie often within each other. FIG. 5. is a schematic diagram illustrating the data processing hierarchy in a database system consistent with the principles of the present invention. The outer loops 510 are controlled by the application program 250 (for instance retrieval of a list of employees). The loops in between 520 are controlled by the database runtime system 210 (for instance collection of each of the attributes for the employee, department information etc. This may involve several loops into several tables to retrieve all necessary information.) The inner loops 530 are controlled by the storage engine RISK module 215 (for instance, this is a collection of each of the disk blocks required to gather the necessary information, and to split these block into single data items). Generally, it is reasonable to add as much functionality as possible in the innermost loop to stop the looping as early as possible. If the kernel has enough information to stop looping, it is likely to believe that it has enough knowledge to process the data as well. It is therefore very tempting to add too much functionality in the innermost loop and thereby slowing down the entire system.

Consistent with the principles of the present invention, all processing of data from the innermost loops 530 are moved to the loops 520, which are controlled by the runtime module 210. The RISK module 215 has the sole responsibility of finding the data as efficiently as possible, but never process the data. As the majority of database processing is looping, the RISK module 215 also serializes the innermost loops. Instead of start the looping process all over each time it gains control, it simply continues from where it was when it gave control back to the database runtime module 210 last time. This obviously reduces looping depth and reduces the total number of instructions needed to complete a task.

The database structure consistent with the principles of the present invention gives a non interpreting database runtime, minimal sized runtime module tailored to the actual problem area, database runtime that rums the most efficient code, full flexibility with respect to external interfaces, maintainability as normal systems, a runtime module that is able to handle all kind of constraints, and a portable and scalable database system.

The database approach according to the invention does not contain any online data dictionary. All data dictionary information is embedded in the database runtime module. This means that there is no need for data dictionary inquiries. Requests like 'Describe table person' can be fulfilled immediately without any dictionary inquiries. All consistency checking code is generated as part of the code, so there is no need for interpreting consistency information.

Additionally, the runtime module does not contain any superfluous code. If there are no float data types in use, no code to handle float data types will be generated as part of the database runtime. The same applies for consistency checking as well. This ensures a code that is minimal for the actual data model (and data dictionary) and will further ensure a minimal sized database system.

Further, as the database system doesn't contain any unnecessary code, it will outperform the market leading database systems. As the code generator knows the exact table layout, all integrity rules and where to apply them an optimal algorithms for data retrieval and manipulation cant be chosen by the code generator.

Additionally, full flexibility with respect to external interfaces is provided. A traditional data dictionary normally consists of external view information (i.e. SQL Views) that may be used to tailor an interface to a specific application. On the other hand traditional database systems only support one kind of database interfaces (Relational, Network oriented, Hierarchical, ObjectRelational or ObjectOriented). They never support a mix of these.

A particular development tool for developing solutions according to the invention has the knowledge of external views (also with respect to different database technologies), so it car, generate all interfaces needed, tailored to the actual database.

Figure 6:
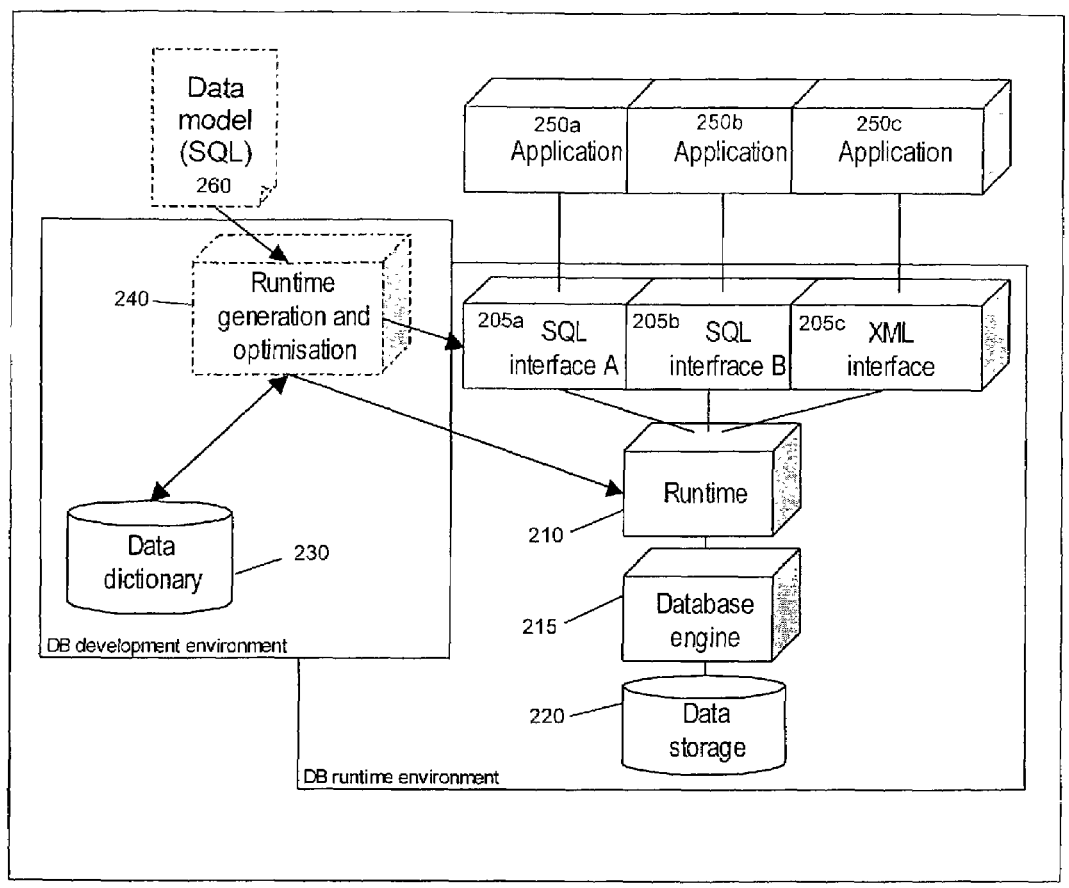
FIG. 6 depicts an exemplary block diagram illustrating the use of various application interfaces in a database system consistent with the principles of the present invention.

FIG. 6 is a block diagram illustrating the use of various application program interfaces (APIs) in a database system according to the invention. This figure shores that more applications 250a, 250b, 250c can access the same database. The code generator 240 can not only generate the runtime module, but also (by use of particular templates) different application program interfaces 205a, 205b, 205c on top of the database runtime module 210. Each of these interfaces 205x, 205b, 205c can be used simultaneously to allow access to the database from different applications 250a, 250b, 250c, respectively. For instance, a booking application and a flight control application can both access the schedule in the database using an SQL interface, while an XML based flight publication application concurrently access the schedule.

The database system of the present invention is as maintainable as normal systems. The inventive approach allows the same type of system development as traditional database system development. The application developers focus on just the same aspects, which are developing business logic, user interfaces and interfaces to other systems.

The database API (Application Program interface) looks like ordinary database APIs and offers the same functionality.

If changes in the data model 260 occurs, a new runtime module is generated (in traditional system the database schema (or model) has to be compiled and stored in a dictionary). On the surface this looks the same, but the difference inside the database system is essential.

The database runtime module of the present invention is able to handle all types of constraints. As the development tool knows the concept of conceptual integrity rules the code that is produced is able to handle all types of constraints. In fact it is able to handle both dynamic and static integrity rules, and also rules that works both ways (equal and exclude constraints).

The database system consistent with the principles of the present invention provides for a portable and scalable database system. As the generator produces ANSI C code, the C code itself will ensure portability. As the actual dictionary is divided from the run time, the runtime module may also be generated using another programming language, for instance, Java, C++, Basic, or Pascal. Because of the above mentioned facts the database system according to the invention is also well suited for hand held devices with limited computing power.

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone.

What is claimed is:

1. A computer system for providing access to a database upon a request from an application computer program, comprising:
   a data model represented in a data dictionary;
   an application program interface;
   a data storage;
   a database kernel, providing access from the application program interface to the data storage;
   wherein said database kernel includes a database runtime module for providing access from the application program interface to the database kernel, said runtime module being dynamically changeable, dependent on the data model represented in the data dictionary, and
   wherein said database kernel further includes a storage engine module for providing access from the runtime module to the data storage, said storage engine module being invariable and independent of said data model;
   an automatic code generator, said code generator being adapted to generate an executable program code, irrespective of which format or programming language the code is generated, for the runtime module based upon the data model represented in the data dictionary; and
   wherein said system executes the generated program code based on the data model represented in said data dictionary.

2. The computer system according to claim 1, wherein the program code for the runtime module is generated by the code generator subsequent to any amendments in the data model.

3. The computer system according to claim 1, wherein said storage engine is adapted to offer the runtime module platform-independent access to the data stored in the data storage.

4. The computer system according to claim 3, wherein said storage engine is adapted to store and retrieve data elements of a first data structure (BASE), including an unordered set of data, and data elements of a second data structure (INDEX), including an ordered set of data.

5. The computer system according to claim 4, wherein said storage engine is adapted to provide an identifier (Rowid) in each data elements (BASE) of said first data structure, and to provide data elements (INDEX) of said second structure wherein each entry has a set of such associated identifiers (Rowid).

6. The computer system according to claim 1, wherein said code generating module is adapted to generate descriptive code or procedural code, dependent on the syntactical data provided from the template.

7. A computer system for providing access to a database upon a request from an application computer program, comprising:
   a data model represented in a data dictionary;
   an application program interface;
   a data storage;
   a database kernel, providing access from the application program interface to the data storage;
   wherein said database kernel includes a database runtime module for providing access from the application program interface to the database kernel, said runtime module being dynamically changeable, dependent on the data model represented in the data dictionary, and
   wherein said database kernel further includes a storage engine module for providing access from the runtime module to the data storage, said storage engine module being invariable and independent of said data model;
   an automatic code generator, said code generator being adapted to generate an executable program code, irrespective of which format or programming language the code is generated, for the runtime module based upon the data model represented in the data dictionary, wherein said code generator comprises a source code generating module and a compiler module, said code generating module, in operation, generates a source code to be processed by the compiler module, thus generating said executable program code; and
   wherein said system executes the generated program code based on the data model represented in said data dictionary.

8. The computer system according to claim 7, wherein said code generating module is adapted for receiving structural data provided from the data dictionary; receiving syntactical data provided from a template; and processing said structural data in accordance with rules defined by the syntactical data, thus producing source code adapted for input to the compiler module.

9. The computer system according to claim 8, wherein said code generating module is adapted to generate descriptive code or procedural code, dependent on the syntactical data provided from the template.

10. The computer system according to claim 7, wherein the program code for the runtime module is generated by the code generator subsequent to any amendments in the data model.

11. The computer system according to claim 7, wherein said code generating module is adapted for receiving structural data provided from the data dictionary; receiving syntactical data provided from a template; and processing said structural data in accordance with rules defined by the syntactical data; thus producing source code adapted for input to the compiler module.

12. The computer system according to claim 7, wherein said storage engine is adapted to offer the runtime module a platform independent access to the data stored in the data storage.

13. The computer system according to claim 7, wherein said storage engine is adapted to store and retrieve data elements of a first data structure (BASE), including an unordered set of data, and data elements of a second data structure (INDEX), including an ordered set of data.

14. The computer system according to claim 7, wherein said storage engine is adapted to provide an identifier (Rowid) in each data elements (BASE) of said first data structure, and to provide data elements (INDEX) of said second structure wherein each entry has a set of such associated identifiers (Rowid).

15. A method for providing access to a database upon a request from an application computer program, comprising:
   representing a data model in a data dictionary;
   providing an application program interface and a data storage;
   providing access from the application program interface to the data storage by a database kernel;
   providing access from the application program interface to the database kernel by a database runtime module embedded in the database kernel, said runtime module being dynamically changeable, dependent on the data model represented in the data dictionary, and
   providing access from the runtime module to the data storage by a storage engine module embedded in the database kernel, said storage engine module being invariable and independent of said data model;
   generating an executable program code by an automatic code generator embedded in the database kernel, irrespective of which format or programming language the code is generated, for the runtime module based upon the data model represented in the data dictionary; and
   executing the generated program code based on the data model represented in said data dictionary.

16. The method according to claim 15, further comprising: generating the program code for the runtime module by the code generator subsequent to any amendments in the data model.

17. The method according to claim 15, wherein said storage engine is adapted to offer the runtime module platform-independent access to the data stored in the data storage.

18. A The method according to claim 17, further comprising: storing and retrieving data elements of a first data structure (BASE), including an unordered set of data, and data elements of a second data structure (INDEX), including an ordered set of data.

19. The method according to claim 18, further comprising: providing an identifier (Rowid) in each data elements (BASE) of said first data structure, and to provide data elements (INDEX) of said second structure wherein each entry has a set of such associated identifiers (Rowid).

20. The method according to claim 15, wherein said code generating module is adapted to generate descriptive code or procedural code, dependent on the syntactical data provided from the template.

21. A method for providing access to a database upon a request from an application computer program, comprising:
   representing a data model in a data dictionary;
   providing an application program interface and a data storage;
   providing access from the application program interface to the data storage by a database kernel;
   providing access from the application program interface to the database kernel by a database runtime module embedded in the database kernel, said runtime module being dynamically changeable, dependent on the data model represented in the data dictionary, and
   providing access from the runtime module to the data storage by a storage engine module embedded in the database kernel, said storage engine module being invariable and independent of said data model;
   generating an executable program code by an automatic code generator embedded in the database kernel, irrespective of which format or programming language the code is generated, for the runtime module based upon the data model represented in the data dictionary, wherein said code generator comprises a source code generating module and a compiler module, said code generating module being adapted to generate a source code to be processed by the compiler module, thus generating said executable program code; and executing the generated program code based on the data model represented in said data dictionary.

22. The method according to claim 21, further comprising: receiving structural data provided from the data dictionary; receiving syntactical data provided from a template; and processing said structural data in accordance with rules defined by the syntactical data, thus producing source code adapted for input to the compiler module.

23. The method according to claim 22, further comprising: generating descriptive code or procedural code, dependent on the syntactical data provided from the template.

24. The method according to claim 22, wherein said storage engine is adapted to provide an identifier (Rowid) in each data elements (BASE) of said first data structure, and to provide data elements (INDEX) of said second structure wherein each entry has a set of such associated identifiers (Rowid).

25. The method according to claim 21, further comprising: generating the program code for the runtime module generated by the code generator subsequent to any amendments in the data model.

26. The method according to claim 21, wherein said storage engine is adapted to offer the runtime module a platform independent access to the data stored in the data storage.

27. The method according to claim 21, wherein said storage engine is adapted to store and retrieve data elements of a first data structure (BASE), including an unordered set of data, and data elements of a second data structure (INDEX), including an ordered set of data.

* * * * *